US007067146B2

(12) United States Patent
Grahn

(10) Patent No.: US 7,067,146 B2
(45) Date of Patent: *Jun. 27, 2006

(54) FOOD COMPOSITIONS AND METHODS OF PREPARING THE SAME

(75) Inventor: Tom Grahn, Turku (FI)

(73) Assignee: Eritocap Oy, Turku (FI)

( * ) Notice: Subject to any disclaimer, the term of this patent is extended or adjusted under 35 U.S.C. 154(b) by 0 days.

This patent is subject to a terminal disclaimer.

(21) Appl. No.: 10/959,059

(22) Filed: Oct. 7, 2004

(65) Prior Publication Data

US 2005/0079204 A1 Apr. 14, 2005

Related U.S. Application Data

(63) Continuation of application No. 10/148,001, filed as application No. PCT/FI00/01028 on Nov. 24, 2000, now Pat. No. 6,814,975.

(30) Foreign Application Priority Data

Nov. 24, 1999 (FI) ................................. 19992511

(51) Int. Cl.
*A61K 47/00* (2006.01)
*A61K 9/00* (2006.01)
*A23L 1/29* (2006.01)

(52) U.S. Cl. ...................... 424/439; 424/400
(58) Field of Classification Search ................ 424/439, 424/400
See application file for complete search history.

(56) References Cited

U.S. PATENT DOCUMENTS

2002/0155091 A1* 10/2002 Huval et al. .............. 424/78.29

FOREIGN PATENT DOCUMENTS

| DE | 3531482 A2 | 3/1986 |
| JP | 11206340 A | 8/1999 |
| KR | 9303886 B | 5/1993 |
| WO | WO 97/43911 A1 | 11/1997 |

OTHER PUBLICATIONS

Sugiyama et al., STN International, File CAPLUS accession No. 1997:497879, Document No. 127:190023, J. Nutr, vol. 127, No. 4, pp. 593-599 (1997).
Sugiyama et al., STN International, File CAPLUS accession No. 1996:250189, Document No. 124: 288004, Lipids, vol. 31, No. 4, pp. 399-404 (1996).

(Continued)

*Primary Examiner*—Michael Hartley
*Assistant Examiner*—Simon J. Oh
(74) *Attorney, Agent, or Firm*—Birch, Stewart, Kolasch & Birch, LLP

(57) ABSTRACT

The present invention concerns a food composition having a foodstuff and substantially pure eritadenine. The invention also concerns a food additive having a liquid or solid material intended to be added to a foodstuff, said material being supplemented with substantially pure eritadenine. Furthermore, the invention concerns methods for preparation of the food composition so as to provide a food composition having an increased level of eritadenine in comparison to the inherent eritadenine level of the foodstuff(s) included in the food composition.

21 Claims, 1 Drawing Sheet

OTHER PUBLICATIONS

Rokujo et al., STN International, File CAPLUS accession No. 1970:119887, Document No. 72:119887, Life Sci., vol. 9, No. 7, pp. 379-385 (1970).

Saeki et al., File Caplus, Caplus accession No. 1989:134105, Document accession No. 110:134105, Nutr. Rep. Int., vol. 39, No. 1, pp. 185-195 (1989).

Notes from Pyorala, Atherosclerosis VII, 1986 Proceedings, p. 42 (with partial English translation).

Merck Index, 12th Edition, Merck & Co., Inc., NJ 1996, p. 624.

Suzuki et al., Mushroom Science IX (Part I) Proceedings of the Ninth International Scientific Congress on the Cultivation of Edible Fungi, Tokyo 1974, 463-467.

Kovanen, Ravinnon rasvat ja kuidut suomalaisten terveyden kannalta, KELA julkaisuja ML: 115, 1992, p. 15 (with partial English translation).

* cited by examiner

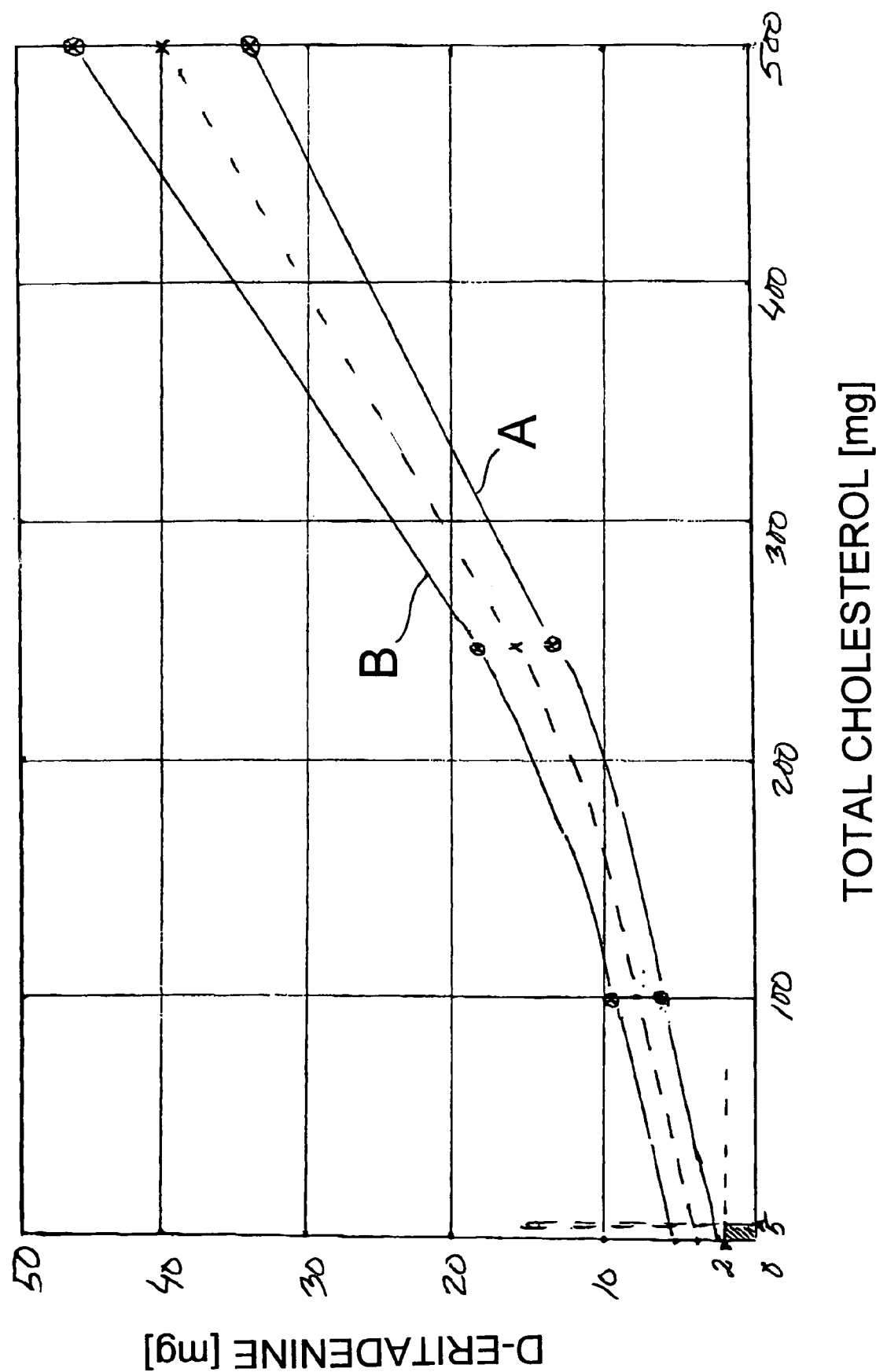

FOOD COMPOSITIONS AND METHODS OF PREPARING THE SAME

CROSS-REFERENCE TO RELATED APPLICATIONS

This application is a 37 C.F.R. § 1.53(b) continuation of U.S. application Ser. No. 10/148,001 filed on May 24, 2002 now U.S. Pat. No. 6,814,975, which is the national phase under 35 U.S.C. § 371 of PCT International Application No. PCT/FI00/01028 which has an International filing date of Nov. 24, 2000, and which designated the United States of America. International Application No. PCT/FI00/01028 claims priority on Finnish Application No. 19992511 filed on Nov. 24, 1999. The contents of each of the above-identified applications is hereby incorporated by reference.

BACKGROUND OF THE INVENTION

1. Field of the Invention

This invention relates to novel food compositions and food additives. The invention also concerns methods for preparing said food compositions.

2. Description of Related Art

It is generally known and accepted that one of the major risk factors for Coronary Heart Disease (CHD) is hypercholesteremia. Other risk factors are age and gender, smoking, diabetes mellitus, and hypertension.

Due to environmental factors and the huge spread of genetic heritage factors, it is difficult or even impossible directly to confirm a dependency between natural nutritional habits and the development of atherosclerosis which eventually leads to CHD. Therefore the relationship between cause and effect has had to be established based on a combination of pathophysiological, clinical and epidemiological studies into an associated chain of evidences. Hence, in epidemiological research a dependence between diet and serum lipid levels and composition, in clinical research a dependence between serum lipid levels and composition and coronary heart disease and in pathoanatomical research a dependence between coronary heart disease and arthritic atherosclerosis is confirmed. (Petri Kovanen, in Ravinnon rasvat ja kuidut suomalaisten terveyden kannalta, KELA julkaisuja ML:115, 1992, page 51). Hypercholesteremia is a major, if not even the biggest single, CHD factor.

Further, there exists a dependency between the risk factors of CHD and total cholesterol, the higher level of cholesterol, the higher risk of CHD (Framingham-study). In this respect it is not necessary to detail the individual lipoprotein dependence on CHD (negative or positive ingredients). However, population-wise a total cholesterol frequency and CHD risk factor curve may be drawn (Kalevi Pyörälä in Atherosclerosis VII, 1986 Proceedings, on page 42) Governmental Medical and Medicinal bodies issue drug-administrative guidelines for what percentile of this frequency curve should be offered drug therapy. CHD and atherosclerosis prevention by using modern hypocholesteremia drugs is a more than 10 Billion USD business and these medicines are among the best-selling drugs in the world. The most important cholesterol lowering drug are formed by statins (lovastatin, atorvastatin, simvastatin and fluvastatin), bilic acid sequestrants, nicotinic acid (niacin) and fibrates (bezafibrate and gemfibrozil).

The great majority of population suffering from or prone to incur hypercholesteremia take voluntary steps for lowering the cholesterol level while avoiding the direct use of the above mentioned drugs. These steps include physical exercises, nutritional aspects and cholesterol lowering functional food components (diets). Dietary ingredients proposed for lowering blood serum cholesterol include fat soluble plant stanol esters which can be added directly into food, plant sterols (non-esterified), phyllium which comprises soluble fibres, and tocotrienols extracted from palm oil.

The human cholesterol balance and metabolism is a delicate and complicated medical biochemical process which can essentially be divided into the interacting dependence between an enterohepatic and an exterohepatic circle (cf. Petri Kovanen in the KELA ML:115 book, p. 53). Most of the hypercholesteremia drugs, especially the above mentioned modern drugs like the statins, intervene with competitive inhibition at the committing rate limiting step in the enterohepatic circle in the formation of mevalonate, i.e. the HMG-COA reductase activity. This effect is called "endogenous cholesterol-depression" or "endogenous cholesterol inhibition". The effect of these agents on the cholesterol level of the serum is strong. Intervention in and interference with the cholesterol balance by cholesterol-lowering functional food components is primarily carried out in the exterohepatic circle (in the following also called "exogenous cholesterol-depression or inhibition"). Examples of such food components are fibres, sitostanol esters etc.

Although the present dietary, cholesterol-lowering ingredients offer an interesting alternative for providing functional food components, there are some considerable limitations of their use. One of the most important limitations of the application of the commercial plant stanol esters and plant sterol mixtures (Benecol, Phytrol) is their poor solubility in other media than fats. For this reason, plant stanol esters and sterol mixtures are available only as margarine, salad dressings and candy bars.

Clearly, there is a need for a novel kind of food component which could be formulated into a functional food component and which would have a strong effect on the enterohepatic circle of the cholesterol balance. It should be noted that ingestion of plant sterol esters or sterol mixtures in at least 20–30 g daily doses in the form of margarines, salad dressings or candy bars is already an obesity risk factor for humans. And obesity per se is a risk factor for atheroma lesion formation and CHD.

By legend, the mushroom shiitake (*Lentinula edodes*) was the elixir of life for people in the Far East. In the 1960's and 1970's it was found that one of the particularly valuable components of shiitake was eritadenine, which is an aliphatic adenin and which is present in shiitake at concentrations of about 500 to 900 ppm.

Eritadenine is capable of reducing the concentration of cholesterol in blood serum (the Merck Index, 12th Edition, Merck & Co., Inc. NJ 1996, p. 624). Functional foods for lowering cholesterol concentration have been prepared by drying shiitake mushrooms, by pulverising the dried mushrooms and by extracting and concentrating the product to obtain an extract which can be mixed into food, such as gum, candy, soup etc., as disclosed in KR 9303886, Lotte Confectionary Co. DE Published Patent Application No. 3 531 482, Mori & Co. teaches a process for preparing a health-promoting foodstuff which contains as active ingredients soy bean lecithin and a powder of dried shiitake mushrooms.

As apparent from the above survey, the beneficial effect of eritadenine on the cholesterol level in serum is well-documented in the art. There are also some food products available which utilise this effect. In practice, the suggested foodstuffs are rather expensive and the demand for them is therefore limited. For many consumers drastic changes of dietary habits are difficult to implement and to continuously keep up. In view of the limited supply and narrow range of the modified food products, it would not even be possible for a consumer to completely change nutritional habits and, thus, to obtain a remedy for his increased serum cholesterol balance.

Further, it should be noted that many consumers (as well as the world of renowned international cuisines) find that food products containing animal fats, including cream, butter meat etc.) are more tasty than products solely or primarily containing vegetable fats. However, animal fats are also rich in saturated fats. The American Heart Association and the National Cholesterol Education Program gives the dietary guideline that no more than 8 to 10% of the day's calories should come from saturated fat and no more than 30% from fat overall. This means that animal fats should in practice entirely be avoided, since they generally contain over 50% saturated fat.

The present invention is based on the finding that the efficient reduction of the blood serum cholesterol level achieved by eritadenine, in particular d-eritadenine, is so strong that it will, even at low dosages, compensate for the cholesterol raising effect by animal fat products. In a prior study by Suzuki and Ohshima [Mushroom Science IX (Part I) Proceedings of the Ninth International Scientific Congress on the Cultivation of Edible Fungi, Tokyo 1974, 463–467], it was found that the serum cholesterol decreased when 60 g butter was taken together with 90 g of fresh shiitake mushrooms. The authors also suggests that shiitake be added to meals having large animal fats content such as sukiyaki and pork stew not only to improve the taste but also to help prevent or even cure hardening of the blood vessels.

The particular problem with using mushrooms as a source of eritadenine is that the concentration of eritadenine in the mushrooms is rather small. This means that the amount of mushrooms necessary for satisfying the human daily need is large (in excess of 500 g). Further, since the concentration is variable (500 to 900 ppm) and since it is not possible to standardize the shiitake production so as to provide a constant eritadenine content, it is impossible accurately to estimate and to adjust the added amount of eritadenine when mushrooms are used as a source of eritadenine.

Finally, it must be borne in mind that some people, approximately about 3% of the whole population, cannot eat mushrooms at all and about 20 to 30% of the population are allergic to mushrooms and especially to mushrooms in the unprepared form. This unavailability of unprepared mushrooms and their ingredients has to do with the very active and strong amino acidic and polysaccaridic complex composition which is fungus specific. A well-known fact is that mushrooms contain a lot of fibres, up to 50% of the dry matter, and one of the main fibre ingredients is chitin. Chitin in excessive amounts creates digestive problems in humans.

SUMMARY OF THE INVENTION

It is an aim of the present invention to remove the problems of the prior art by providing novel kind of food products and methods for the preparation thereof.

The present invention is based on the concept of adding eritadenine, especially d-eritadenine, in substantially pure form, particularly in synthetic form, to any foodstuff, including also conventional, animal fat containing products, such as meat, eggs, diary products etc. in a sufficient amount to provide an increased concentration of eritadenine so as to improve health value of the foodstuffs and to make these food products available even for persons following strict diets.

By "increased concentration of eritadenine" it is meant that the eritadenine content is higher than that of the foodstuff as such. In conventional shiitake mushroom dishes, the eritadenine content is derived from the mushroom. By contrast, the present food compositions contain more eritadenine, especially d-eritadenine, than inherently present in the mushrooms and therefore they have an "increased concentration". According to the present method, this increase of the eritadenine concentration is accomplished by admixing eritadenine in substantially pure form with a foodstuff.

Furthermore, according to the present invention it has been found that eritadenine will act synergistically with traditional nutrient additives having an exogenous cholesterol-depressing or inhibiting effect. This will provide for completely new groups of novel kind of foodstuffs. Finally, the present invention also aims at providing a means for controlling the addition level of the eritadenine.

Thus, according to one aspect, this invention concerns a food composition comprising a foodstuff and substantially pure eritadenine.

According to another aspect, the invention concerns a food additive comprising a liquid or solid material intended to be added to a foodstuff, said material being supplemented with substantially pure eritadenine.

According to a third aspect, this invention concerns a method for the preparation of the food composition, comprising mixing substantially pure eritadenine with the foodstuff, so as to provide a food composition having an increased level of eritadenine in comparison to the inherent eritadenine level of said foodstuff.

According to a still fourth aspect, the invention concerns a method of adding eritadenine to a foodstuff to provide a modified foodstuff having an increased eritadenine concentration, comprising the steps of mixing substantially pure eritadenine with a food additive, especially a food additive having a distinct taste and/or flavour to form a mixture; and adding said mixture to the foodstuff.

The invention provides considerable advantages. Thus, by incorporating eritadenine, especially d-eritadenine, into any of a large number of existing food products it becomes possible to produce modified foodstuffs which preserve the taste and flavour of the original foodstuff while exhibiting the beneficial counter-balancing effect of eritadenine on the cholesterol-raising action of animal fats. In contrast to the present dietary components, eritadenine can easily be produced in large amounts either by direct synthesis or by extraction from natural sources such as mushrooms. Thus, the supply of eritadenine is not a bottle-neck for the production of the modified foodstuffs. Eritadenine is soluble in fats but it can also be converted into the corresponding sodium salt which makes it soluble in aqueous solutions. By using substantially pure eritadenine instead of mushrooms the adverse effects associated with the intake of excessive amounts of mushrooms can be avoided. In particular, the modified foodstuffs according to the present invention are digestible for any consumers. Further, the use of substantially pure eritadenine will allow for exact and reliable dosing of the eritadenine as a function of the actual cholesterol content of the foodstuff.

As regards the therapeutic action of eritadenine it should be noted that it acts endogenously in a dose-dependent manner and can be used as a functional food component in small doses for reducing the total cholesterol of normal human beings. By contrast, existing methods provide for food components having an exogenous effect on the cholesterol balance and these dietary components therefore have to be used in extremely large doses in comparison to eritadenine. Eritadenine acts rapidly, even in small doses and, in comparison to existing functional food components which do not have the present effect, it is possible with the small doses to reach the same effect on a longer term than with higher doses on shorter term. The present invention makes it possible to produce a functional food component which acts in a druglike manner influencing human phospholipidic metabolic step sequences, still preserving the true features of a functional food component. As mentioned above, eritadenine has the additive effects of not only dose-dependent, endogenous cholesterol-depression but also therapeutic effects like endogenous linoleic acid formation and blood plasma viscosity reduction.

Next the invention will be examined in more closely with the aid of the following detailed description with reference to the attached drawing which indicates the dosing of eritadenine as a function of the cholesterol content of the foodstuff.

BRIEF DESCRIPTION OF THE DRAWING

The enclosed FIGURE indicates the minimum amount of eritadenine addition (line A) as a function of the amount of cholesterol contained in a foodstuff. The FIGURE also shows the recommended maximum dosage (line B), which means that the area between the two lines represents the particularly preferred dosing range of eritadenine based on the amount of cholesterol in the food.

DETAILED DESCRIPTION OF THE INVENTION

Definitions:

In the following, the term "eritadenine" shall be understood to cover the compound itself as well as its derivatives. Such derivatives shall be understood to include, for example, esters, deoxy-derivatives, N-oxides and acetonides. Racemates, geometric isomers and stereoisomers of said compounds as well as salts of said compounds are included in the definition. Furthermore, formulations aimed, for example, at improving its usability in food compositions shall also be understood to be included in the definition.

"d-Eritadenine" stands for "2(R), 3(R)-dihydroxy-4-(9-adenyl)butyric acid (D-erythro-form). The compound is also known as lentinacin and lentysine. For the purpose of the present invention it is also possible to use, e.g., l-eritadenine (2S,3S), threo-(2S,3R) and threo-(2R,3S) eritadenine, although the d-isomer is the most efficient.

For the purpose of the present invention "substantially pure" eritadenine designates a product which comprises substantially pure eritadenine having a purity of at least 50%, preferably at least 80%, in particular at least 90% or even at least 95% by weight of the product. The substantially pure d-eritadenine is preferably produced by synthesis. Alternatively, the substantially pure eritadenine can be isolated from natural sources. A particularly valuable source of eritadenine is the mushroom shiitake (*Lentinus edodes*). The extraction is described e.g. by Chibata et al in Experientia 25 (1969) 1237. Eritadenine can also be obtained from champignons (*Agaricus bisporus*). Synthesis of eritadenine is disclosed by Kamiya et al., in Tetrahedron Letters 1969, 4729, and in Chem. Ind. 1970 652. According to a preferred embodiment of the present invention, the eritadenine component used is free from the mushroom fibers and other mushroom residues, which may influence the use of the eritadenine (cf. the above-mentioned mushroom allergy).

The term "primary foodstuff" stands for foodstuffs which have usually only been subjected to one processing step, often by the actual producer, before delivery to the consumer. Examples of primary foodstuffs are the following: Meat such as meat of veal, roast beef, filet steak, entrecote, pork meat, minced meat, lambs meat, wild animal, chicken meat, and further including various prepared meat dishes in the form of stews and casseroles. Primary foodstuffs are also comprised of liver and blood products, sauces, seafood and fish, and egg products.

"Secondary foodstuff" stands for foodstuff which has been further processed by a manufacturer en route from producer to consumer. Secondary foodstuffs are exemplified by the following prepared dishes: vegetarian steaks, gratinated vegs, oven made lasagne, fish and ham with potatoes, meat pasta dishes, soups, hamburgers, pizzas, sausage products, pastries and bakery products, bread, milk product including cream, ice cream and cheese.

The term "food compositions" include any products—raw, prepared or processed—which are intended for human consumption in particular by eating or drinking and which may contain nutrients or stimulants in the form of minerals, carbohydrates (including sugars), proteins and/or fats, and which have been modified by the incorporation of at least substantially pure eritadenine. The present modified food compositions can also be characterised as "functional foodstuffs or food compositions". It is, of course, possible to incorporate other components into the products, as well. The term "foodstuffs" above is generally used for designating the corresponding products in unmodified form.

The term "foodstuff" shall also, according to one embodiment, be understood to mean pure drinking water.

The term "food additive" shall be understood to mean any a liquid or solid material intended to be added to a foodstuff. This material can, for example, be an agent having a distinct taste and/or flavour, such as a salt or any other taste or flavour potentiator or modifier. It is to be noted, however, that the food additive according to this invention does not necessary have to be an agent having a distinct taste and/or flavour. The sole role of the food additive can be to bring eritadenine into the foodstuff or food composition.

Salt and glucose solutions for intravenous administration may also be modified by incorporation of eritadenine.

The present invention is based on the exceptional cholesterol-reducing activity of eritadenine.

Fat in animals and humans are transported in the form of lipoproteins. Lipoproteins consist of four main classes, viz. triglycerides, phospholipids, free cholesterol and cholesterol esters. Logistically, lipoprotein vehicles are the surface components, free cholesterol and phospholipids, and the core transported consists of triglycerides and cholesterolesters. The major endogenous lipoprotein balance or imbalance exists between the liver secretion of lipoprotein VLDL, the precursor to LDL, and the reverse cholesterol transport to the liver mediated by HDL and LDL receptor activity (Petri Kovanen, page 54) In normal humans this balance or imbalance dictates an excess, a normal state or a deficient state of total cholesterol in the blood plasma. By lowering the secretion, and/or increasing the HDL mediation and susceptibility, and/or increasing the uptake of the liver (LDL receptor activity), the plasma cholesterol level is reduced.

Eritadenine has an endogenous effect on the cholesterol metabolism. As discussed above, modern cholesterol medicines also work endogenously and slow down the endogenous cholesterol production. Generally the functional dietary components used for lowering cholesterol level in serum work exogenously. By combining eritadenine with known exogenously working dietary additives it is possible to efficiently reduce the cholesterol level solely by the use of functional dietary food components by feedback inhibition and similar biochemical processes.

The phospholipid level is generally known closely to correlate with the cholesterol and therefore in routine medical screening, phospholipid tests are not conducted. Phospholipids consist of several subclasses, namely phosphatidycholine PC (lecithin)
phosphatidylethanolamine PE (cephalin)
phosphatidylserine PS
phosphatidylinositol PI
sphingomyelin SM, as closely related.

Phospholipids are also easily remodeled meaning the change of fatty acids primarily in positions 1 and 2. The phospholids have a fluidity increasing (or viscosity decreasing) influence due to saturation/unsaturation of fatty acids and or chain lengths of fatty acids in positions 1 and 2. They behave amphoterically, i.e. they have both hydrophilic and hydrophobic properties. In particular PC and PE are methylation/demethylation dependent via the SAM/SAH cycle (SAM=S-denosylhomomethionine; SAH=S-adenosylhomocysteine).

It is possible to achieve favourable changes in the blood plasma cholesterol pattern by reducing the molar ratio of total cholesterol/phospholipid ratio and/or changing the phospolipid molar ratio of PC/PE and/or inhibiting enzymatically controlled reactions where PC and PE is directly or indirectly via the SAM/SAH cycle involved. The following theory has been formulated:

Step 1: Total PL and PL (phospholipids) composition may be changed by kinetics of the SAM and SAH cycle.
Step 2: SAM and SAH concentrations are inhibited/stimulated by intervening in the methionine and cysteine metabolism
Step 3: In this metabolism SAH degradation to adenosine and homocysteine is an enzymatic reaction catalysed by SAH hydrolase. By inhibiting partially, not totally, SAH hydrolase, the concentration of SAH will rise affecting the SAM/SAH ratio and step 1 will be executed.

Eritadenine has been tested for use in the above model. The results were:
1. d-eritadenine is rapid in SAH hydrolase inhibition
2. d-eritadenine inhibits already in small doses
3. d-eritadenine inhibits partially, no total blocking
4. based on available scientific data, d-eritadenine is safe to use.

We have found that eritadenine, especially d-eritadenine, is eligible as a functional food component. It acts in a drug-like manner, inhibiting the endogenous synthesis of cholesterol metabolism and the enterohepatic fat circle. d-eritadenine is effective in very low absorbed doses, at 1 ppm+-level, ensuring safety and essential metabolic step preservation.

d-eritadenine has the feature of equal effects: lower doses and longer time, higher doses and shorter time. d-eritadenine is dose-dependent at low doses, maximising the opportunity of addition to foodstuff in general, and to exogenously acting cholesterol depressing foodstuffs in particular.

The use of eritadenine as a functional food component contains two essential synergistic effects. The first one is the synergistic effect of multiplication in the human cholesterol metabolism. The human system is based on an exogenic or exterohepatic cholesterol loop and an endogenous or enterohepatic cholesterol loop. These loops in the human system are interconnected by feedback inhibition and other similar medicinal biochemical signal systems in a way that depressing one and the other is enhanced and vice versa. Hence, by combining the endogenic cholesterol-depressing effect with any exogenically active cholesterol depressor a synergistic multiplicatory effect can be obtained, which is greater than the additive effect of each alone.

Thus, the addition of eritadenine, especially d-eritadenine, to an exogenously acting existing functional food will more than double the cholesterol-depressing effect due to enterohepatic and exterohepatic multiplicatory effects. Mathematically consecutive 10% reductions would give 18% total reduction, and consecutive 15% reductions would give 28% total reduction, by the present invention, due to the feedback inhibition created by the simultaneous exogenous and endogenous actions of the food components, a greater decrease of the cholesterol level will be achieved. The food compositions according to the present invention may therefore comprise a (conventional) food component having an exterohepatic cholesterol depressing effect. Such a food component can be selected from the group of fibers, chitosan, tocotrienols, plant sterols, stanol esters and sitostanol esters. The concentration of the food component is about 0.1 to 50 wt-%, in particular about 0.5 to 10 wt-%, of the dry matter of the food composition. Usually the food components having an exterohepatic or exogenous cholesterol depressing effect have a dose response of 2–3 g per day, every day during 14 days, and the achievable cholesterol reduction is about 10%. As the addition of the endogenously acting d-eritadenine is on the order of 5 to 50 mg as dose response, depending on the dietary cholesterol amount, to achieve a reduction of cholesterol in excess of 20% cholesterol reduction, the weight ratio of the above-mentioned cholesterol to the endogenously acting d-eritadenine is 2–3 g/5–50 mg=50–500 times, or more generally eritadenine-to-exogenous cholesterol lowering agent (wt/wt) ratio is 10–1000.

The second synergistic effect is the "cleaning effect of dirty food". Based on dietary recommendations, in respect of the fatty acids and their concentrations, a diet is "unhealthy" when it contains more saturated fatty acids than (mono- or poly-) unsaturated fatty acids. Many foodstuffs contain animal fat i.e. cholesterol. Thus, for example:

| cholesterol mg/100 g | | | |
|---|---|---|---|
| <15 | 15–100 | 200–300 | 600- |
| milk yoghurt | cheese meat | butter intestinal organs | egg roe |

"Dirty food" is food that contains animal fat, i.e., cholesterol, and saturated fatty acids. The more saturated, the "dirtier". The synergistic effect of eritadenine is the endogenous cholesterol lowering effect and the additive effect of suppressing the consumed cholesterol. And changing the fatty acid composition into a more favourable format.

Eritadenine can be used in industrial foodstuff production where cholesterol-containing ingredients are employed. In industrial food preparation the addition of eritadenine should be made based on the calculated overall cholesterol content and the corresponding necessary eritadenine addition requirement (cf. table below).

Thus, according to an embodiment, the invention provides a food composition comprising animal fat and a source of d-eritadenine and having an increased concentration of d-eritadenine.

According to a preferred embodiment, the modified foodstuffs (optionally containing animal fat) according to the present invention contain at least 5 mg cholesterol per 100 g of gross weight and they comprise at least 2 ppm d-eritadenine calculated from the dry weight of the composition.

The food composition can contain only substantially pure eritadenine as a source of eritadenine or it may comprise mushrooms together with the substantially pure eritadenine. In the latter case, the "increased concentration" amounts to at least 1 ppm d-eritadenine in excess of that inherently occurring in the food composition.

The mushroom component is preferably obtained from a mushroom selected from shiitake (*Lentinula edodes*) and champignon (*Agaricus bisporus*) and mixtures thereof.

As a practical scheme of eritadenine addition, the following table may be mentioned:
- up to 15 mg cholesterol and 2 to 5 mg d-eritadenine;
- over 15 mg and up to 100 mg cholesterol and 3 to 10 mg d-eritadenine;
- over 100 mg and up to 300 mg cholesterol and 5 to 25 mg d-eritadenine;
- over 300 mg and to 600 mg cholesterol and 15 to 50 mg d-eritadenine; and
- over 600 mg cholesterol and 40 mg or more (preferably up to 50 mg) d-eritadenine.

The animal fat portion of the food compositions comprises at least 50% saturated fatty acids of the total amount of fatty acids. The food composition comprises e.g. a primary foodstuff selected from the group of milk, meat products, sauces, liver and blood products, fish and seafood, and egg products. The food composition may also comprise secondary foodstuff selected from the group of processed meat products, prepared sausage products, prepared soups, prepared pasta dishes, prepared vegetarian dishes, bakery products, and processed milk products.

Eritadenine is best supplied in a dose-dependent manner via widely and generally used taste and flavour enhancers. The most commonly used taste enhancer is salt. The eritadenine content in salt is easily regulated as the human perception of too much or too little salt is a narrow gap. Secondly, eritadenine can easily as well be included in any other flavour enhancing agent or flavour potentiators acting via the umami passway, such as glutamate (MSG), inosinate (IMP) or gualynate products (GMP). Examples of other interesting taste and/or flavour enhancers are the following: agents influencing saltiness (halides of group IA elements), sourness (protonic organic acids), sweetness (inorganic compounds, sugars, polyhydric alcohols, carboxylic acids, amino acids, peptides, proteins, glycosides, isocoumarin derivatives, indole alkaloids, synthetic sweetening agents), bitterness (alkaloids, terpenes, sugars (beta-D-mannose) flavonoids, amino acids, peptides) and taste modifiers (gymnemic acid, taste-modifying proteins which change the taste from sour to sweet, and chlorogenic acid, cynarin). Still other examples comprise menthol and piperine and similar compounds which cause specific taste sensations.

In other words, eritadenine is used in a food additive, e.g., with an agent having a distinct taste and/or flavour having an intensity which is indicative of the amount of eritadenine added. Thus, the present invention comprises a method of adding eritadenine to foodstuffs to provide modified foodstuffs having an increased eritadenine concentration, comprises the steps of mixing substantially pure eritadenine with a food additive, in particularly a food additive having a distinct taste and/or flavour to form a mixture; and adding said mixture to a foodstuff.

EXAMPLE

Based on the above, the following table has been compiled for the admixture of eritadenine with common foodstuffs to provide modified food compositions having improved properties. The required eritadenine addition varies depending on the dry substance content of the foodstuff. The indicated amount of eritadenine will compensate the increase of the serum cholesterol balance cause by the animal fats of the foodstuffs. Although an upper limit of the addition is suggested, it is to be understood that overdosing is also possible.

TABLE

Cholesterol content of Primary and Secondary Foodstuffs and required d-eritadenine dosage

| | cholesterol mg/100 g gw | d-eritadenine ppm* | comment |
|---|---|---|---|
| Primary Foodstuff | | | |
| Meat | | | |
| Roast beef | 90 | 5–10 | prepared |
| Filet steak | 62 | 4–8 | prepared |
| Entrecôte | 83 | 5–10 | prepared |
| Pork | 100 | 5–10 | prepared |
| Minced meat | 70 | 4–8 | prepared |
| Lamb | 70 | 4–8 | prepared |
| Wild animal | 50–120 | 4–12 | prepared |
| Chicken grilled | 80 | 5–10 | prepared |
| Stews and Casseroles | 50–150 | 5–12 | prepared |
| Sauces | | | |
| *bearnaise | 500 | 35–45 | prepared |
| *hollandaise | 450 | 30–40 | prepared |
| *cream | 16 | 3–5 | prepared |
| *cheese | 130 | 8–12 | prepared |
| Liver and blood Containing | | | |
| Minced liver | 140 | 8–12 | prepared |
| Liver pate | 250 | 13–20 | prepared |
| Seafood | | | |
| Pike perch | 75 | 4–8 | prepared |
| Pike | 110 | 6–11 | prepared |
| Salmon | 90 | 5–10 | natural and cultivated |
| Roe | 230 | 12–17 | prepared |
| Tuna | 70 | 4–8 | prepared |
| Lobster | 60 | 4–8 | prepared |
| Prawns | 180 | 10–14 | prepared |
| Egg products | | | |
| Boiled egg or fried | 385 | 25–35 | prepared |
| Egg yolk | 1150 | 50 max | prepared |
| Omelette, 2 egg | 320 | 20–27 | prepared |
| Secondary Foodstuff | | | |
| Vegetarian steak | 70 | 4–8 | prepared |
| Gratinated vegs | 50 | 3–6 | prepared |
| Spinach, carrot or alike blini Oven made | 30 | 2–5 | prepared |

TABLE-continued

Cholesterol content of Primary and Secondary
Foodstuffs and required d-eritadenine dosage

|  | cholesterol mg/100 g gw | d-eritadenine ppm* | comment |
|---|---|---|---|
| Lasagne | 20 | 2–5 | prepared |
| Fish, Ham with potatoes | 40 | 3–6 | prepared |
| Meat & macaroni | 45 | 3–6 | prepared |
| Soups |  |  |  |
| Pea | 10 | 2–5 | prepared |
| Meat | 10 | 2–5 | prepared |
| Fish | 10 | 2–5 | prepared |
| Sausage | 15 | 2–5 | prepared |
| Hamburger | 25 | 2–5 | prepared |
| Pizza | 30 | 3–6 | prepared |
| French fries | 25 | 3–6 | prepared |
| Sausage products |  |  |  |
| all | 40–70 | 4–8 | prepared |
| Processed meat Products |  |  |  |
| all | 40–80 | 4–8 | prepared |
| Sweet bakery | 30–100 | 4–12 | prepared |
| Products |  |  |  |
| Milk products |  |  |  |
| Milk | 6–12 | 2–5 | prepared |
| Cream | 50 | 4–8 | prepared |
| Yoghurt | 10–15 | 2–5 | prepared |
| Ice cream | 35 | 3–6 | prepared |
| Cheese | 50–100 | 5–10 | prepared | g.w. = gross weight
*calculated on dry base of the foodstuff

The nutritionally recommended maximum daily intake of cholesterol in any form is 300 mg. This daily intake corresponds to a daily intake of d-eritadenine intake on 15–25 mg for the optimum cholesterol depressing effect.

The invention claimed is:

1. A food composition, which comprises a foodstuff and substantially pure d-eritadenine and a food component having an exterohepatic cholesterol depressing effect.

2. The food composition according to claim 1, wherein the food component having an exterohepatic cholesterol depressing effect is selected from the group consisting of fibers, chitosan, tocotrienols, plant sterols, stanol esters and sitostanol esters.

3. The food composition according to claim 1 or 2, wherein the concentration of the food component is about 0.1 to 50 wt-% of the dry matter of the food composition.

4. The food composition according to claim 1 or 2, comprising a food additive, such as an agent having a distinct taste and/or flavor having an intensity which is indicative of the amount of d-eritadenine added.

5. The food composition according to claim 4, wherein the agent having a distinct taste and/or flavor is selected from taste enhancers, flavor enhancers and gualynate products.

6. The food composition according to claim 1 or 2, wherein said food composition comprises animal fat.

7. The food composition according to claim 6, wherein 100 g of said composition comprises at least 5 mg of cholesterol and at least 2 mg of d-eritadenine.

8. The food composition according to claim 1 or 2, further comprising food components containing d-eritadenine.

9. The food composition according to claim 1 or 2, comprising at least 2 ppm of d-eritadenine, calculated on the dry substance of said food composition.

10. The food composition according to claim 1 or 2, wherein 100 g of said composition comprises
   up to 15 mg cholesterol and 2 to 5 mg d-eritadenine;
   over 15 mg and up to 100 mg cholesterol and 3 to 10 mg d-eritadenine;
   over 100 mg and up to 300 mg cholesterol and 5 to 25 mg d-eritadenine;
   over 300 mg and to 600 mg cholesterol and 15 to 50 mg d-eritadenine; or
   over 600 mg cholesterol and 40 mg or more d-eritadenine.

11. The food composition according to claim 6, wherein the animal fat comprises at least 50% saturated fatty acids of the total amount of fatty acids.

12. The food composition according to claim 1 or 2, comprising a primary foodstuff selected from the group consisting of milk, meat products, sauces, liver and blood products, fish and seafood, and egg products.

13. The food composition according to claim 1 or 2, comprising a secondary foodstuff selected from the group consisting of processed meat products, prepared sausage products, prepared soups, prepared pasta dishes, prepared vegetarian dishes, bakery products, and processed milk products.

14. A method of producing a food composition according to claim 1 or 2, comprising mixing substantially pure d-eritadenine with a foodstuff, said food composition comprising an increased level of d-eritadenine in comparison to the inherent level of the foodstuff.

15. The method according to claim 14, wherein the foodstuff comprises a primary or secondary foodstuff which optionally contains an additional source of d-eritadenine.

16. The method according to claim 14, wherein d-eritadenine is mixed with the foodstuff in an amount sufficient to provide a food composition having an eritadenine concentration of at least 2 ppm, calculated from the dry weight of the composition.

17. The method according to claim 14, comprising mixing with a foodstuff containing up to 15 mg cholesterol and 2 to 5 mg d-eritadenine;
   a foodstuff containing over 15 mg and up to 100 mg cholesterol and 3 to 10 mg d-eritadenine;
   a foodstuff containing over 100 mg and up to 300 mg cholesterol and 5 to 25 mg d-eritadenine;
   a foodstuff containing over 300 mg and to 600 mg cholesterol and 15 to 50 mg d-eritadenine; or
   a foodstuff containing over 600 mg cholesterol and 40 mg or more d-eritadenine.

18. The method according to claim 14, comprising adding d-eritadenine in the form of a mixture comprising d-eritadenine together with an agent having a distinct taste and/or flavor, so that the added amount of d-eritadenine should be deductible from the intensity of that taste and/or flavor.

19. The method according to claim 18, comprising adding d-eritadenine together with a taste enhancer and/or a flavor enhancer selected from the group consisting of glutamate, inosinate and gualynate products.

20. A method of adding eritadenine to a foodstuff to provide a modified foodstuff or food composition having an increased d-eritadenine concentration and comprising a food component having an exterohepatic cholesterol depressing effect, comprising the steps of mixing substantially pure eritadenine with a food additive to form a mixture; and
   adding said mixture to the foodstuff.

21. The method of claim 20, wherein said food additive is an additive having a distinct taste and/or flavor.

* * * * *